US012353147B2

(12) United States Patent
Wu

(10) Patent No.: US 12,353,147 B2
(45) Date of Patent: Jul. 8, 2025

(54) CHIP MODULE OF TONER CARTRIDGE

(71) Applicant: GENERAL PLASTIC INDUSTRIAL CO., LTD., Taichung (TW)

(72) Inventor: Yi-Chia Wu, Taichung (TW)

(73) Assignee: GENERAL PLASTIC INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 18/386,370

(22) Filed: Nov. 2, 2023

(65) Prior Publication Data

US 2025/0147450 A1 May 8, 2025

(51) Int. Cl.
*G03G 15/08* (2006.01)
*G03G 21/16* (2006.01)

(52) U.S. Cl.
CPC ..... *G03G 15/0863* (2013.01); *G03G 21/1652* (2013.01)

(58) Field of Classification Search
CPC ........... G03G 15/0863; G03G 21/1652; G03G 21/1867
See application file for complete search history.

(56) References Cited

U.S. PATENT DOCUMENTS 10,547,132 B2 * 1/2020 Wu .................... G03G 15/0863

* cited by examiner

*Primary Examiner* — Hoang X Ngo
(74) *Attorney, Agent, or Firm* — Birch, Stewart, Kolasch & Birch, LLP

(57) ABSTRACT

A chip module of a toner cartridge includes a substrate, a memory, and a plurality of terminals. The substrate is provided with a plurality of circuit traces thereon. The memory is mounted to the substrate and electrically connected with the circuit traces. The terminals are spacedly arranged with respect to each other. Each of the terminals includes a connection portion mounted to the substrate and electrically connected with one of the circuit traces, and two contact ends electrically connected with the connection portion and spaced from each other. Because each terminal has two contact ends to be electrically connected and mechanically contacted with a conductive strip of a reading head of an electronic image-forming apparatus, the electrical connection between the chip module and the reading head of the electronic image-forming apparatus can be secured, thereby avoiding poor electrical contact.

12 Claims, 7 Drawing Sheets

CHIP MODULE OF TONER CARTRIDGE

BACKGROUND OF THE INVENTION

1. Field of the Invention

The present invention relates generally to an electronic image-forming apparatus and more particularly, to a chip module of a toner cartridge for being used in an electronic image-forming apparatus.

2. Description of the Related Art

An electronic image-forming apparatus, such as photocopier, printer, etc., is generally quipped with a replaceable toner cartridge therein. The front end of the toner cartridge is provided with a chip module, which is used to contact a reading head of the electronic image-forming apparatus for communication of relevant information. The reading head has a base, several communication conductive strips, and a grounding conductive strip. To align the chip module with the reading head accurately, a protruding post is provided on the base, the grounding conductive strip is provided at two lateral edges of the protruding post, and the communication conductive strips are arranged by the two lateral sides of the protruding post. Correspondingly, the chip module is provided with a plurality of terminals to be electrically and mechanically coupled with the communication and grounding conductive strips for information transmission.

Since the toner cartridge is a consumable item, it needs to be replaced when the toner is exhausted out. After multiple installations of the replaced toner cartridges with the reading head, the communication and grounding conductive strips are inevitably subject to some deformation, resulting in poor electrical contact between the chip module and the reading head. Therefore, designing an alignment structure of the chip module to ensure that each newly inserted toner cartridge can be positively aligned and contacted with the reading head of the electronic image-forming apparatus to avoid poor electrical contact under a condition of low manufacturing cost to alleviate consumers' burden has become a technical challenge that the industry is striving to overcome.

SUMMARY OF THE INVENTION

The present invention has been accomplished in view of the above-noted circumstances. It is an objective of the present invention to provide a chip module of a toner cartridge, which can ensure positive electrical contact between the chip module and a reading head of an electric image-forming apparatus, thereby avoiding poor electrical contact.

It is another objective of the present invention to provide a chip module of a toner cartridge, which has a low manufacturing cost, thereby alleviating the burden on consumers.

To attain the above-mentioned objectives, the present invention provides a chip module of a toner cartridge comprising a substrate, a memory, and a plurality of terminals. The substrate is arranged with a plurality of circuit traces thereon. The memory is mounted to the substrate and electrically connected with the circuit traces. The terminals are spacedly arranged with respect to each other. Each of the terminals comprises a connection portion mounted to the substrate and electrically connected with one of the circuit traces, and two contact ends electrically connected with the connection portion and spaced from each other. Because each terminal has two contact ends to be electrically connected and mechanically contacted with a conductive strip of a reading head of an electronic image-forming apparatus, the electrical connection between the chip module and the reading head of the electronic image-forming apparatus can be secured, thereby avoiding poor electrical contact. Further, the terminals can be made having a same structure, thereby lowering the manufacturing cost of the chip module to alleviate the consumer's burden.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
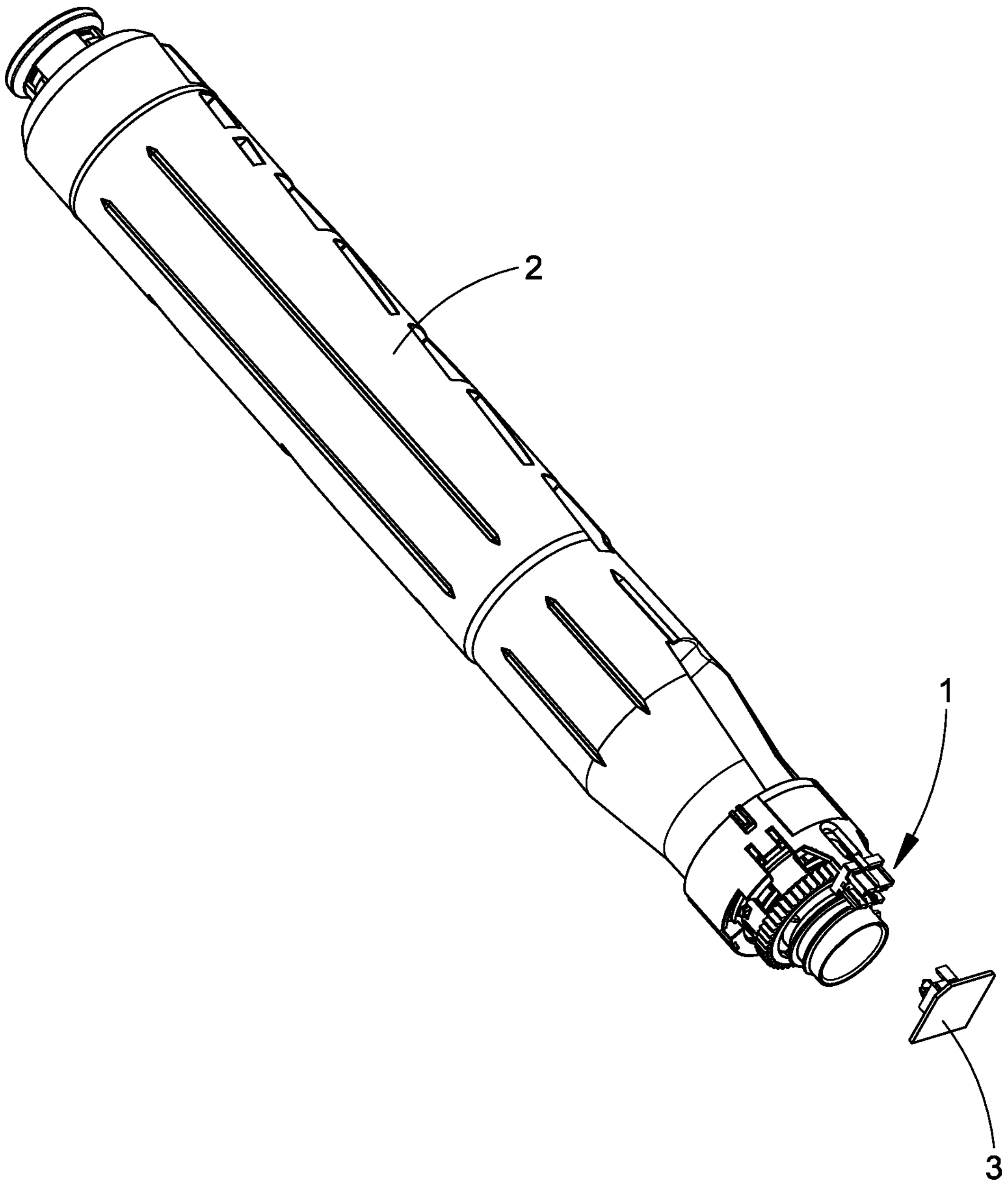
FIG. 1 is a perspective view showing that a chip module of a toner cartridge according to an embodiment of the present invention is separated from a reading head.
Figure 2:
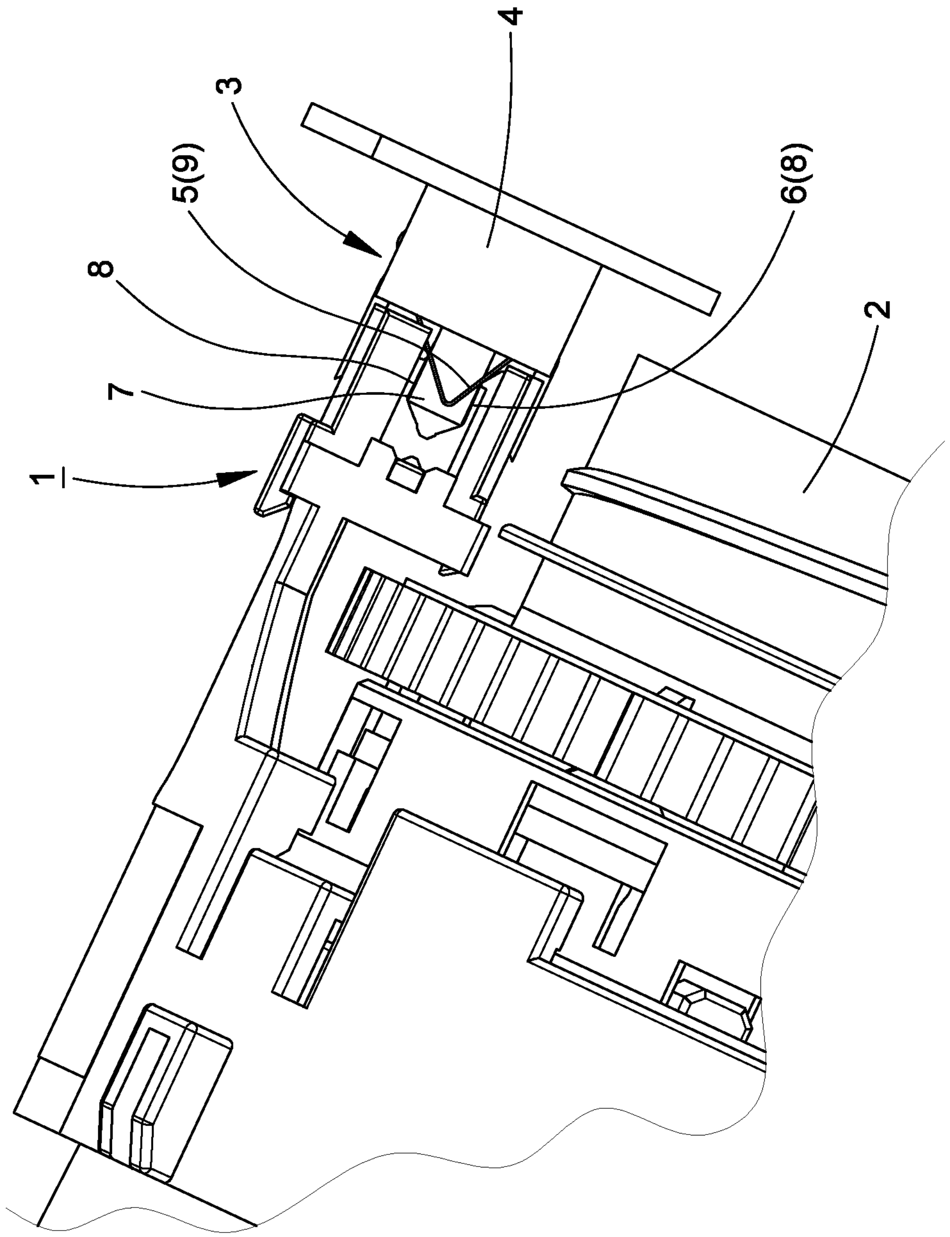
FIG. 2 is an enlarged, partially cutaway front view showing that the chip module of the embodiment of the present invention is coupled with the reading head.
Figure 3:
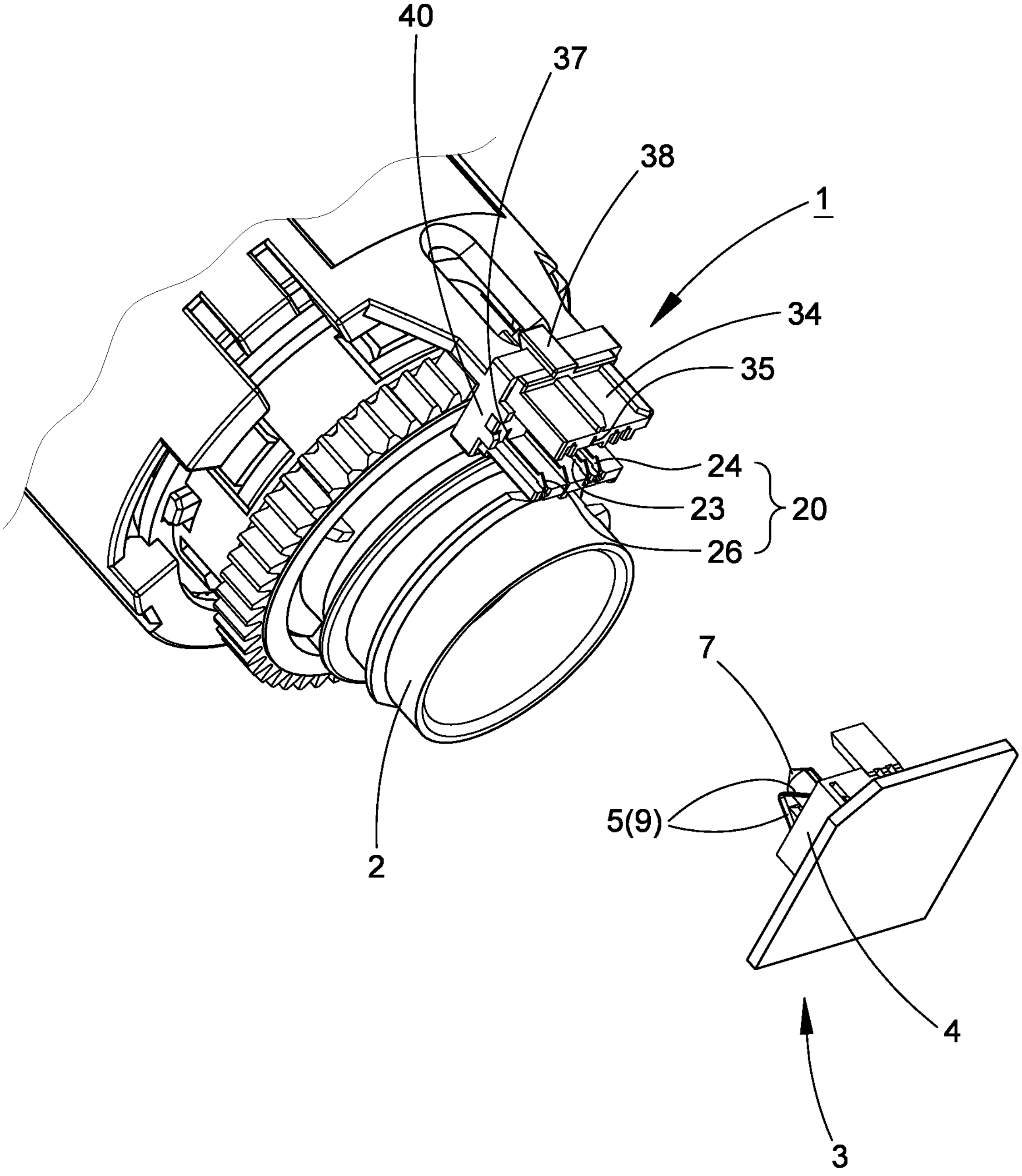
FIG. 3 is an enlarged view of a part of FIG. 1.
Figure 4:
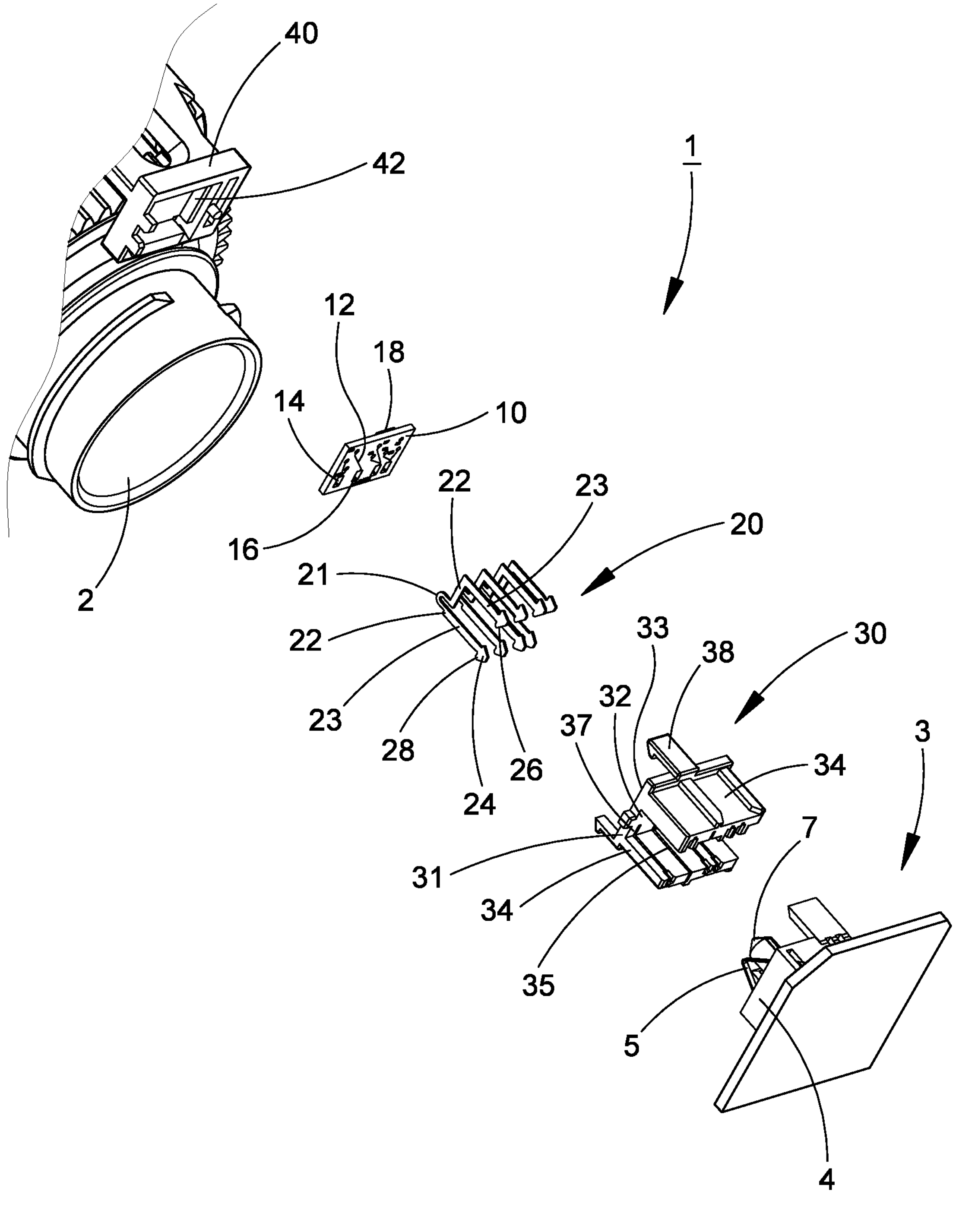
FIG. 4 is an exploded perspective view of the chip module of the toner cartridge of the embodiment of the present invention.
Figure 5:
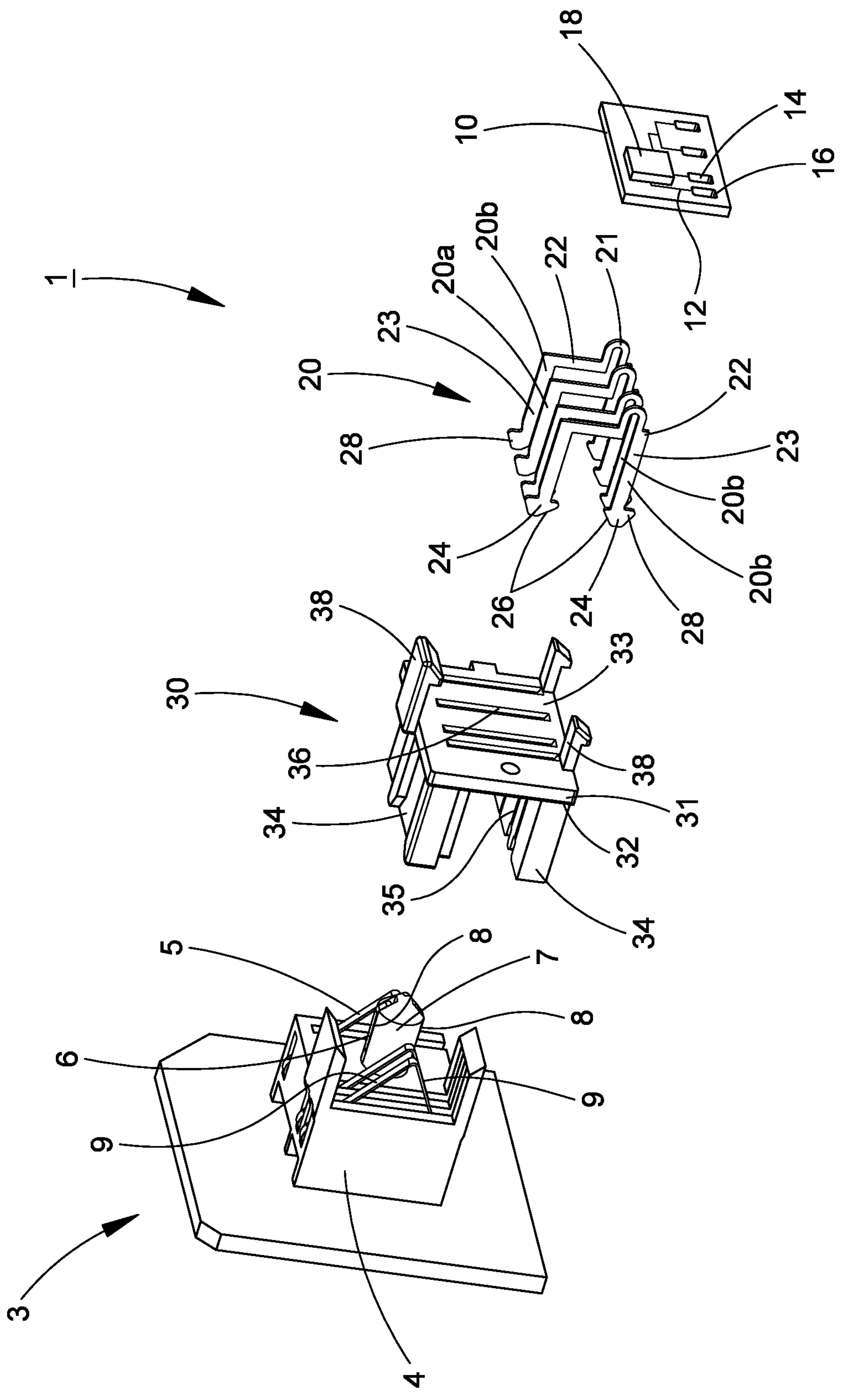
FIG. 5 is another perspective view of the chip module of the toner cartridge of the embodiment of the present invention.

Hereunder an embodiment will be detailedly described with accompanying drawings for illustrating technical features and structure of the present invention. FIGS. 1-5 depict a chip module 1 of a toner cartridge 2 in accordance with an embodiment of the present application. The chip module 1 is positioned at the front end of the toner cartridge 2 for being mechanically and electrically coupled to a reading head 3 of an electronic image-forming apparatus (not shown) to facilitate message transmission between the toner cartridge 2 and the electronic image-forming apparatus. The reading head 3 includes a base 4, three communication conductive strips 5, and a grounding conductive strip 6. The base 4 is provided with a protruding post 7 located between the three communication conductive strips 5, and the grounding conductive strip 6 has two exposed portions 8 located at two opposite lateral sides of the protruding post 7. The communication conductive strips 5 each have an L-shaped profile having an included acute angle and two lateral wings 9. Both the communication conductive strips 5 and the grounding conductive strip 6 can experience elastic deformation when they receive external force thereon. The chip module 1 comprises a substrate 10, a memory 18, four terminals 20, a terminal mount 30, and a retaining mount 40.

The substrate 10 is equipped with a plurality of circuit traces 12, and the substrate 10 has four through holes 14. The wall of each through hole 14 is provided with a contact 16. The memory 18 is mounted on one side of the substrate 10 and electrically connected with those circuit traces 12. The memory 18 stores relevant information about the toner cartridge 2.

The four terminals 20 are formed by sheet pieces and arranged in parallel with each other. Each terminal 20 includes a connection portion 21 to be disposed to the substrate 10 and electrically connected with one of the circuit traces 12, a base portion 22 extending from the connection portion 21, two suspension arms 23 extending from two ends of the base portion 22, two contact ends 24 extending from the terminal ends of the two suspension arms 23 in two directions towards to each other, and two hooks 28 extending from the terminal ends of the two suspension arms 23 in two directions away from each other. The connection portion 21 is inserted into the through hole 14 of the substrate 10 and electrically connected to the contact 16. The base portion 22 is divided into two parts extending in opposite directions from the connection portion 21. The two suspension arms 23 are parallel to each other and perpendicular to the base portion 22. The two contact ends 24 are electrically connected with the connection portion 21 through the two suspension arms 23 and the base portion 22. The two contact ends 24 are spaced apart from each other and each have a contact surface 26. The two contact surfaces 26 are not parallel to each other, and each have an inclined angle of about 70° to 80°. In another embodiment, the connection portion 21 may be electrically connected to the circuit trace 12 of the substrate 10 by welding, so that the substrate 10 may omit the through holes 14 and the contacts 16. The base portion 22 and/or the two suspension arms 23 may be omitted or replaced with other structures, as long as the two contact ends 24 are electrically connected with the connection portion 21.

The terminal mount 30 includes a base plate 31, two extension plates 34 extending parallelly from a first side 32 of the base plate 31, eight first receiving grooves 35 provided at the inner sides of the two extension plates 34 to accommodate the suspension arms 23 of the terminals 20, four second receiving grooves 36 provided at a second side 33 of the base plate 31 to accommodate the base portions 22 of the terminals 20, eight through slots 37 penetrating through the first side 32 and the second side 33 of the base plate 31 for the pass of the suspension arms 23 therethrough, and three elastic hook arms 38 extending parallelly from the base plate 31 in the direction opposite to the two extension plates 34, wherein the first side 32 and the second side 33 are located on the opposite sides of the base plate 31.

When the terminals 20 are installed into the terminal mount 30, each suspension arm 23 of the terminal 20 is slightly inwardly compressed, forced to pass through the through slot 37 from the second side 33, and then accommodated in the first receiving groove 35. Upon reaching the correct position, the suspension arms 23, due to elastic rebounding force, slightly expand outward, allowing the hooks 28 to engage with the terminal mount 30. In this way, the terminals 20 can be securely combined with the terminal mount 30, and at the meantime, the base portions 22 are precisely positioned in the second receiving grooves 36. This securely fixes the relative positions of the terminals 20. When the terminal mount 30 approaches the substrate 10, the connection portions 21 of the terminals 20 can correctly extend into the through holes 14 and electrically connect with the contacts 16. This not only enables rapid assembly but also eliminates the need to individually align and weld each terminal 20 with the through holes 14 and the contacts 16 of the substrate 10, respectively. Since the actual alignment and welding processes are time-consuming and labor-intensive in the prior art, the present invention can effectively reduce manufacturing costs.

The retaining mount 40 is sleeved onto the front end of the toner cartridge 2 and has a receiving space 42 for accommodating the substrate 10 and the memory 18. When the terminal mount 30 is anchored with the retaining mount 40 by the elastic hook arms 38, the retaining mount 40 is connected to the terminal mount 30, sandwiching the substrate 10 and the memory 18 therebetween. In this way, the chip module 1 can be securely mounted on the toner cartridge 2. In another embodiment, the terminal mount 30 can be connected to the retaining mount 40 by adhesive, snapping, or other means.

Figure 6:
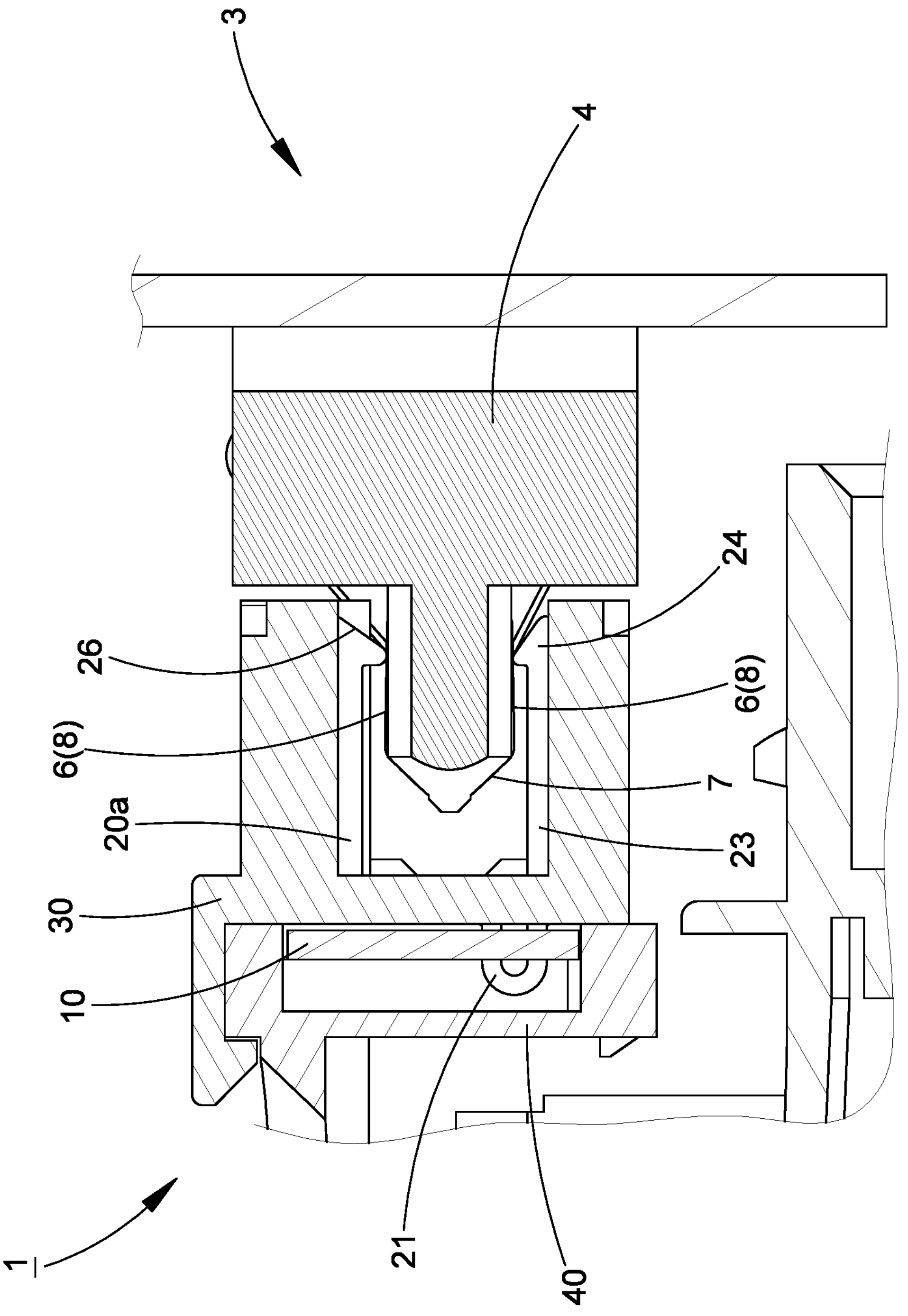
FIGS. 6-7 are two cross-sectional views taken along two sectional parts of FIG. 2.
Figure 7:
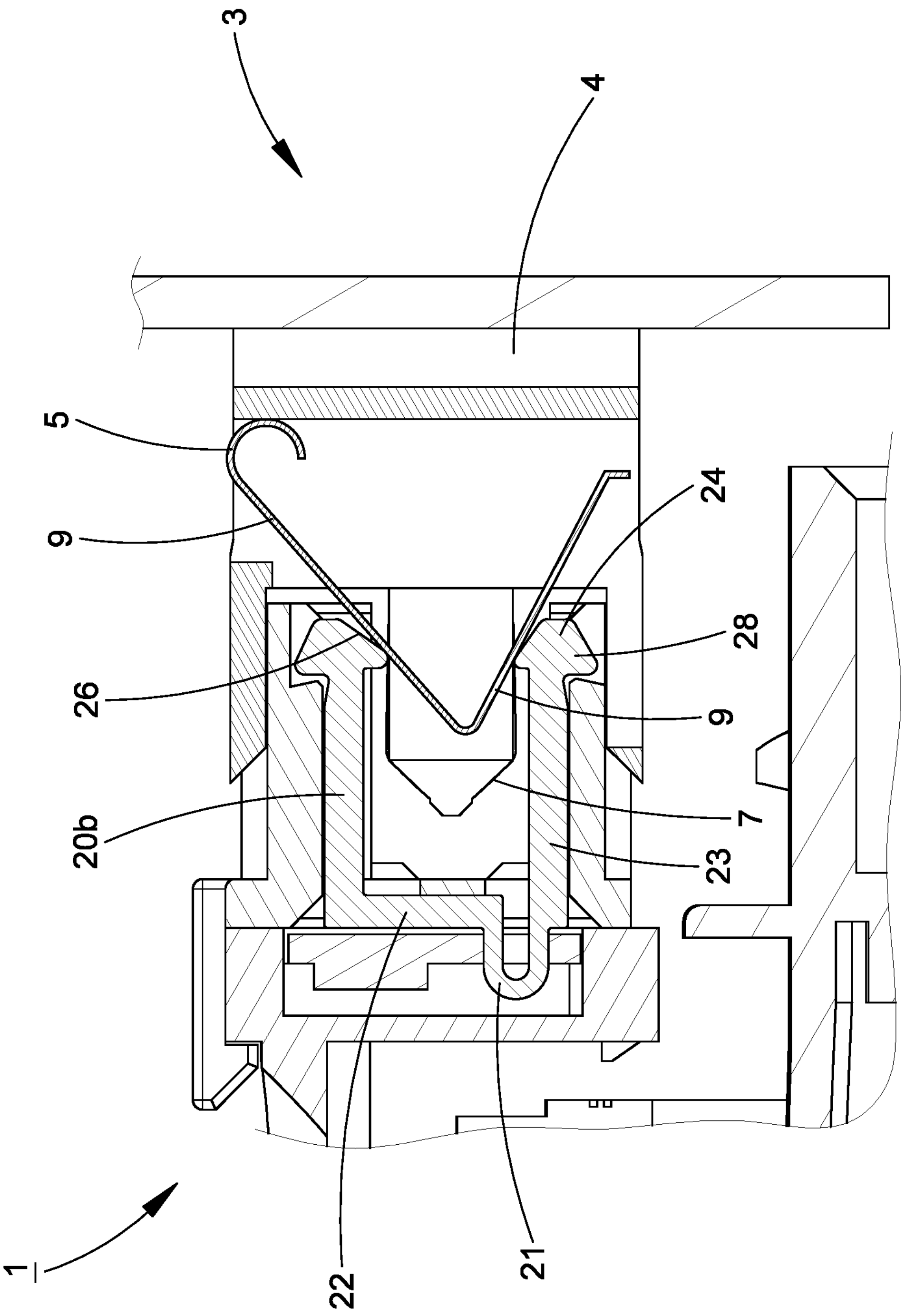

When the toner cartridge 2 is installed into the electronic image-forming apparatus, the chip module 1 is coupled to the reading head 3. The terminals 20 can be divided into a grounding terminal **20*a* and three transmission terminals 20*b* based on their functions. The grounding terminal 20*a* is electrically coupled to the grounding conductive strip 6 in a way that the two contact ends 24 of the grounding terminal 20*a* are abutted against the two exposed portions 8 of the grounding conductive strip 6, as shown in FIG. 6. Each transmission terminal 20*b* is electrically coupled to one of the communication conductive strips 5 in a way that the contact surfaces 26 of the two contact ends 24 of the transmission terminals 20*b* are abutted against the two lateral wings 9 of the communication conductive strips 5, as shown in FIG. 7. Due to the fact that the communication conductive strip 5 may be deformed upon receiving an external force, the contact surfaces 26 may sometimes not contact with the lateral wings 9 in a surface-to-surface manner, but this will not affect the electrical connection therebetween. Since all terminals 20 each have two contact ends 24, there will be two electrical connection areas when each terminal 20 is abutted against one of the communication conductive strips 5 or the grounding conductive strip 6. Even if one contact end 24 cannot correctly abut against the conductive strip due to the deformation of the communication conductive strips 5 or the grounding conductive strip 6, the other contact end 24 can still achieve the purpose of electrical connection. Therefore, the chip module 1** of the present invention ensures electrical connection with the reading head of the electronic image-forming apparatus, thereby avoiding poor electrical contact.

In another aspect, by using terminals 20 having a same structural design, they can be abutted against and positively contacted with the communication and grounding conductive strips 5 and 6 having different structural designs, eliminating the need to manufacture terminals with different shapes using different molds. This approach effectively reduces manufacturing costs, thereby easing the burden on consumers, and achieving the objectives of the present invention.

Based on the above-mentioned technical features, various modifications to the structure of the chip module 1 may be made. For example, the terminal mount 30 may be omitted or modified into a different structure as long as the terminal mount 30 can securely fix the relative positions of the terminals 20. Such variations are not to be regarded as a departure from the spirit and scope of the invention, and all such modifications as would be obvious to one skilled in the art are intended to be included within the scope of the following claims.

What is claimed is:

1. A chip module of a toner cartridge, comprising:

a substrate, on which a plurality of circuit traces are arranged;

a memory mounted to the substrate and electrically connected with the circuit traces; and a plurality of terminals spacedly arranged with respect to each other, each of the terminals comprising a connection portion mounted to the substrate and electrically connected with one of the circuit traces, and two contact ends extended from the connection portion and electrically connected with the connection portion and spaced from each other.

2. The chip module of the toner cartridge as claimed in claim 1, wherein each of the terminals comprises two suspension arms electrically connected with the connection portion, and each of the two suspension arms has a terminal end; the two contact ends are provided at the terminal ends of the two suspension arms, respectively.

3. The chip module of the toner cartridge as claimed in claim 2, wherein the two contact ends extend towards each other from the terminal ends of the two suspension arms.

4. The chip module of the toner cartridge as claimed in claim 3, wherein each of the terminals comprises a base portion extending from the connection portion, and the two suspension arms extend from two ends of the base portion.

5. The chip module of the toner cartridge as claimed in claim 4, further comprising a terminal mount; the terminal mount comprises a base plate having a first side and a second side opposite to the first side, two extension plates extending from the first side of the base plate, a plurality of first receiving grooves provided at the two extension plates to accommodate the suspension arms of the terminals, a plurality of second receiving grooves provided at the second side of the base plate to accommodate the base portions of the terminals, and a plurality of through slots penetrating through the first and second sides of the base plate;

the suspensions arms of the terminals pass through the through slots, respectively.

6. The chip module of the toner cartridge as claimed in claim 5, wherein two hooks extend away from each other from the terminal ends of the two suspension arms of each of the terminals, respectively; the two hooks of each of the terminals are anchored with the terminal mount.

7. The chip module of the toner cartridge as claimed in claim 3, wherein each of the two contact ends of each of the terminals is provided with a contact surface; the contact surfaces of the two contact ends of each of the terminals are not parallel to each other.

8. The chip module of the toner cartridge as claimed in claim 3, further comprising a terminal mount to which the terminals are mounted.

9. The chip module of the toner cartridge as claimed in claim 8, further comprising a retaining mount connected with the terminal mount in a way that the substrate and the memory are held between the terminal mount and the retaining mount.

10. The chip module of the toner cartridge as claimed in claim 9, wherein the terminal mount comprises a plurality of elastic hook arms anchored with the retaining mount.

11. The chip module of the toner cartridge as claimed in claim 1, wherein the terminals are sheet pieces.

12. The chip module of the toner cartridge as claimed in claim 1, wherein the chip module is adapted for being coupled to a reading head of an electronic image-forming apparatus; the reading head comprises a grounding conductive strip and a plurality of communication conductive strips; the terminals comprise a grounding terminal, and a plurality of transmission terminals; the two contact ends of the grounding terminal are adapted for being contacted with the grounding conductive strip of the reading head, and the two contact ends of each of the transmission terminals are adapted for being contacted with one of the communication conductive strips of the reading head.

* * * * *